UNITED STATES PATENT OFFICE.

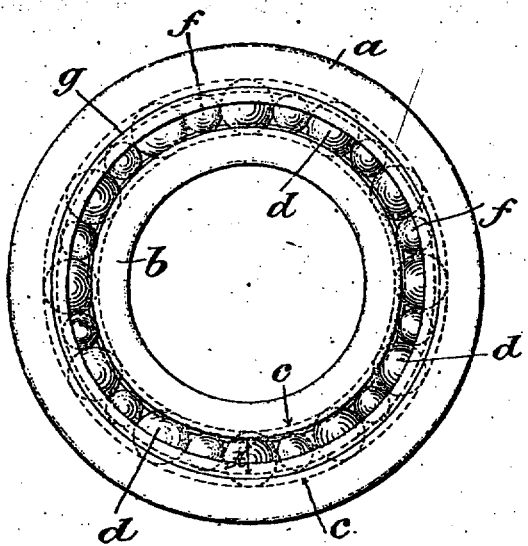
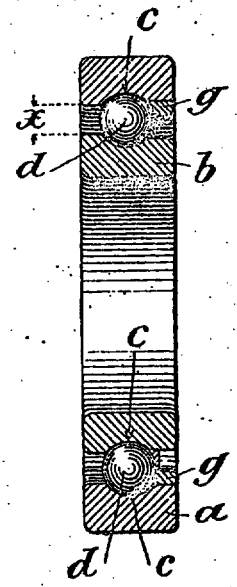

JOSEF WEIBEL-MULISCH, OF ZURICH, SWITZERLAND, ASSIGNOR TO ALFRED WILD-SIEGFRIED, OF THALWIL, NEAR ZURICH, SWITZERLAND.

BALL-BEARING.

No. 898,945.

Specification of Letters Patent.

Patented Sept. 15, 1908.

Application filed June 1, 1906. Serial No. 319,714.

*To all whom it may concern:*

Be it known that I, JOSEF WEIBEL-MULISCH, a citizen of the Republic of Switzerland, residing at Zurich, in Switzerland, have invented new and useful Improvements in Ball-Bearings, of which the following is a specification.

The present invention relates to certain new and useful improvements in ball bearings, and more especially to a new construction of ball-races for bearings of that type in which two concentrical rings are provided in their facing surfaces with grooves which serve as races for the balls, and in which between each two main or running balls there is interposed a spacing ball, the diameter of which is smaller than that of the running balls, but larger than the distance between the facing edges of the concentrical rings.

According to the present invention, one of the edges in one of the rings, in order to introduce the spacing balls into the races between the large balls, is in the form of an easily removable ring of such dimensions as to prevent the spacing balls from falling out sidewise. For introducing these balls, the separable ring, of course, must first be removed.

In the accompanying drawing Figure 1 represents a side elevation; Fig. 2 a vertical section through a bearing.

*a* and *b* are the two concentrical rings, *c* the grooves therein, *d* the running balls, and *f* the spacing balls. These latter have a diameter which is smaller than that of the balls *d*, but larger than the distance *x* between the facing edges of the rings *a* and *b*. The distance between the facing edges of two rings may be contracted on one side by means of a removable ring *g*, so fitted that this ring will readily retain its position within the rings *a*, *b* without any special securing means. If desired, this ring may, however, also be secured by any suitable means that will permit of its easy removal. For the purpose of introducing the spacing balls, the ring *g* is removed, the balls are inserted, and the ring then put in again. The ring *g* is also of such dimension that, when this ring is removed, the running balls cannot be introduced between the concentrical rings *a*, *b*.

To assemble the parts the ring *b* is placed within the ring *a* eccentrically, or so that at one point the ring *b* touches the inner face of ring *a*. Diametrically opposite this point the space between the two rings will be much greater than when the parts are assembled, so that the main or running balls *d* can be readily dropped into the raceway. The balls *d* are then distributed around the raceway and the inner ring *b* moved into position concentric with the outer ring. The spacing balls *f* are then dropped into place between the main balls and finally the ring *g* is sprung into place.

Having now particularly described and ascertained the nature of the said invention and in what manner the same is to be performed, I declare that what I claim is:

1. A ball bearing comprising two concentric continuous rings having grooved faces coöperating to form a ball raceway between them, running balls and spacing balls in the raceway, the distance between the facing edges of the rings on one side being greater than on the other, the edges on one side of the rings having the lesser distance between them, retaining both the running and the spacing balls in the raceway, and the edges of the other side of the rings retaining the running balls, and a spacing ball retaining ring out of contact with the bearing balls beyond the bearing surface of the raceway and secured to one of said rings within the space having the greater distance between the facing edges.

2. A ball bearing comprising two concentric continuous rings having similar grooved faces forming a raceway between them, running balls and spacing balls in the raceway, the distance between the facing edges of the rings when in concentric position being less than the diameter of the running balls said edges retaining them in the raceway, and a locking ring at one side of the bearing surface of the raceway forming the edge of one of the aforementioned rings to lock the spacing balls in the raceway.

3. A ball bearing comprising two concentric continuous rings having similar grooved faces coöperating to form a ball raceway between them, running balls and spacing balls for the running balls in the raceway, the distance between the facing edges of the rings when in concentric position being less than the diameter of the running balls said edges retaining them in the raceway, and a continuous locking ring at one side of the bearing surface of the raceway forming the edge of one of the aforementioned rings to lock the spacing balls in the raceway.

In testimony whereof I have signed my name to this specification in the presence of two subscribing witnesses.

JOSEF WEIBEL-MULISCH.

Witnesses:
 ERNST FISCHER,
 A. LIEBERKNECH.